United States Patent
Yi et al.

(10) Patent No.: US 7,701,890 B2
(45) Date of Patent: Apr. 20, 2010

(54) APPARATUS AND METHOD OF RELEASING A POINT-TO-MULTIPOINT RADIO BEARER

(75) Inventors: Seung-June Yi, Seoul (KR); Young-Dae Lee, Gyeongg-do (KR); Sung-Duck Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 906 days.

(21) Appl. No.: 11/032,556

(22) Filed: Jan. 10, 2005

(65) Prior Publication Data

US 2005/0174956 A1    Aug. 11, 2005

Related U.S. Application Data

(60) Provisional application No. 60/541,233, filed on Feb. 4, 2004.

(30) Foreign Application Priority Data

Apr. 2, 2004    (KR) .................... 10-2004-0023071

(51) Int. Cl.
| | |
|---|---|
| H04H 20/71 | (2008.01) |
| H04B 7/212 | (2006.01) |
| H04W 4/00 | (2009.01) |
| H04W 74/00 | (2009.01) |
| H04L 12/28 | (2006.01) |
| H04L 12/56 | (2006.01) |

(52) U.S. Cl. .................. 370/312; 370/322; 370/329; 370/341; 370/390; 455/455

(58) Field of Classification Search .............. 370/390
See application file for complete search history.

(56) References Cited

U.S. PATENT DOCUMENTS

| 6,771,659 | B1 * | 8/2004 | Parantainen et al. ........ 370/466 |
| 2002/0101698 | * | 8/2002 | Sato et al. .................. 455/3.01 |
| 2003/0012117 | * | 1/2003 | Yano et al. .................. 370/352 |
| 2003/0156540 | A1 * | 8/2003 | Trossen et al. .............. 370/232 |
| 2003/0194992 | A1 * | 10/2003 | Kim et al. ................. 455/414.1 |
| 2003/0224794 | A1 * | 12/2003 | Kim et al. .................. 455/445 |
| 2003/0231612 | A1 * | 12/2003 | Kim et al. .................. 370/342 |
| 2004/0008657 | A1 * | 1/2004 | Lee et al. .................... 370/342 |
| 2004/0085926 | A1 * | 5/2004 | Hwang et al. ............... 370/328 |
| 2004/0087320 | A1 * | 5/2004 | Kim et al. .................. 455/458 |
| 2004/0147266 | A1 * | 7/2004 | Hwang et al. ............... 455/445 |
| 2005/0047359 | A1 * | 3/2005 | Sebire ........................ 370/312 |
| 2006/0106865 | A1 * | 5/2006 | Beming et al. ........... 707/104.1 |
| 2006/0148483 | A1 * | 7/2006 | Howard et al. .............. 455/450 |

OTHER PUBLICATIONS

IEEE 100 The Authoritative Dictionary of IEEE Standards Terms, Standards Information Network IEEE Press, Seventh Edition, p. 872.*

* cited by examiner

Primary Examiner—William Trost, IV
Assistant Examiner—Andrew Chriss
(74) Attorney, Agent, or Firm—Lee, Hong, Degerman, Kang & Waimey

(57) ABSTRACT

A mobile terminal can release a point-to-multipoint radio bearer (RB) in an explicit manner or an implicit manner, whereby an explicit RB release mechanism allows the network to explicitly instruct the mobile terminal to release the RB, while an implicit RB release mechanism allows the mobile terminal itself to release the RB without receiving any explicit instructions from the network.

8 Claims, 5 Drawing Sheets

APPARATUS AND METHOD OF RELEASING A POINT-TO-MULTIPOINT RADIO BEARER

CROSS REFERENCE TO RELATED APPLICATIONS

The present application claims the benefit of Korean application number 023071, filed Apr. 2, 2004, the disclosure of which is incorporated herein by reference, and the benefit of U.S. provisional application No. 60/541,233, filed Feb. 4, 2004, the disclosure of which is incorporated herein by reference.

BACKGROUND

The present invention relates to releasing a point-to-multipoint radio bearer for a multicast or broadcast service in a mobile terminal, and in particular, to determining the releasing of the point-to-multipoint radio bearer by checking a status of the multicast or broadcast service when a data of the multicast or broadcast service is not received for a certain period of time after the mobile terminal establishes the point-to-multipoint radio bearer and receives the data of the multicast or broadcast service.

A universal mobile telecommunication system (UMTS) is a third generation mobile communications system that has evolved from the European Global System for Mobile communications (GSM) that aims to provide an improved mobile communications service based upon a GSM core network and wideband code division multiple access (W-CDMA) wireless connection technology.

FIG. 1 illustrates an exemplary basic structure of a UMTS network. As shown in FIG. 1, the UMTS is roughly divided into a terminal 100 (mobile station, user equipment (UE), etc.), a UTRAN 120, and a core network (CN) 130. The UTRAN 120 includes one or more radio network sub-systems (RNS) 125. Each RNS 125 includes a radio network controller (RNC) 123, and a plurality of base stations (Node-Bs) 121 managed by the RNC 123. One or more cells exist for each Node B.

The RNC 123 handles the assigning and managing of radio resources, and operates as an access point with respect to the core network 130. The Node-Bs 121 receive information sent by the physical layer of the terminal 100 through an uplink, and transmit data to the terminal through a downlink. The Node-Bs 121, thus, operate as access points of the UTRAN 120 for the terminal 100. Also, the RNC 123 allocates and manages radio resources and operates as an access point with the core network 130.

Between various network structure elements, there exists an interface that allows data to be exchanged for communication therebetween.

FIG. 2 illustrates a radio interface protocol architecture (structure) between the terminal 100 and UTRAN 110 that is based upon 3GPP wireless access network technology. Here, the radio access interface protocol has horizontal layers including a physical layer, a data link layer and a network layer, and has vertical planes including a user plane for transmitting data information and a control plane for transmitting control signals. The user plane is a region to which traffic information of a user, such as voice data or Internet-protocol (IP) packets are transmitted. The control plane is a region to which control information, such as an interface of a network or maintenance and management of a call, is transmitted. In FIG. 2, protocol layers can be divided into a first layer (L1), a second layer (L2) and a third layer (L3) based upon the three lower layers of an open system interconnection (OSI) scheme that is well-known in the art of wireless (mobile) communication systems.

Each layer shown in FIG. 2 will now be described. The first layer (L1) uses various radio transmission techniques to provide information transfer service to the upper layers. The first layer (L1) is connected via a transport channel to a medium access control (MAC) layer located at a higher level, and the data between the MAC layer and the physical layer is transferred via this transfer channel. Also, between different physical layers, namely, between the respective physical layers of the transmitting side and the receiving side, data is transferred via a physical channel.

The MAC layer handles the mapping between the logical channels and the transport channels, and provides a re-allocation service of the MAC parameter for allocation and re-allocation of radio (wireless) resources. The MAC layer is connected to an upper layer called a radio link control (RLC) layer through a logical channel, and various logical channels are provided according to the type of transmitted information.

The MAC layer of the second layer (L2) provides services to a Radio Link Control (RLC) layer, which is an upper layer, via a logical channel. The RLC layer of the second layer (L2) can support reliable data transmissions, and can perform a segmentation and concatenation function on a plurality of RLC service data units (RLC SDUs) delivered from an upper layer.

A packet data convergence protocol (PDCP) layer is located at an upper layer from the RLC layer, allowing data to be transmitted effectively via a radio interface with a relatively small bandwidth through a network protocol.

The radio resource control (RRC) layer located at the lowest portion of the third layer (L3) is only defined in the control plane, and controls the transport channels and the physical channels in relation to the configuration, the re-configuration, and the releasing of the radio bearers (RBs).

The radio bearer service refers to a service that the second layer (L2) provides for data transmission between the terminal (UE) 10 and the UTRAN 100 in order to guarantee a predetermined quality of service by the UE and the UTRAN. And in general, the radio bearer (RB) establishment refers to regulating the protocol layers and the channel characteristics of the channels required for providing a specific service, as well as respectively setting substantial parameters and operation methods.

Among the RBs, the particular RB used between the UE and the UTRAN for exchanging RRC messages or NAS messages is called a SRB (Signaling Radio Bearer). When an SRB is established between a particular UE and the UTRAN, a RRC connection exists between the UE and the UTRAN. A UE having a RRC connection is said to be in RRC connected mode, and a UE without a RRC connection is said to be in idle mode. When a UE is in RRC connected mode, the RNC determines the cell in which the UE is located (i.e., the RNC determines the UE location in units of cells), and manages that UE.

Next, multimedia broadcast/multicast service (MBMS) will be described. MBMS refers to a downlink transmission service for providing data services such as, streaming services (e.g., multimedia, video on demand, webcast) or background services (e.g., e-mail, short message services (SMS), downloading), to a plurality of terminals by employing a downlink dedicated MBMS bearer service.

MBMS can be classified into a broadcast mode and a multicast mode. The MBMS broadcast mode refers to transmitting multimedia data to all users within a broadcast area, which is a region where broadcast service is possible. In contrast, MBMS multicast mode refers to transmitting multimedia data to only a certain specified user group within a multicast area, whereby a multicast area, which is a region where multicast service is possible. Thus, an MBMS service may also be referred to as a 'point-to-multipoint service'.

A single MBMS service can consist of one or more sessions, and MBMS data are transmitted to the plurality of terminals via an MBMS bearer service during an ongoing session.

The UTRAN uses a radio bearer (RB) to provide a MBMS bearer service to a terminal. The types of radio bearers used by the UTRAN include a point-to-point (p-t-p) radio bearer and a point-to-multipoint (p-t-m) radio bearer. Here, the point-to-point RB is a bi-directional RB that comprises a logical channel (DTCH: Dedicated Traffic CHannel) and a transport channel (DCH: Dedicated CHannel), and a physical channel (either a DPCH (Dedicated Physical CHannel) or a SCCPCH (Secondary Common Control Physical CHannel)). A point-to-multipoint RB is a uni-directional RB that comprises, as shown in FIG. 3, a logical channel (MTCH: MBMS Traffic CHannel) and a transport channel (FACH: Forward Access CHannel), and a physical channel (SCCPCH: Secondary Common Control Physical CHannel). The logical channel MTCH is configured for each MBMS service provided to a single cell, and is a channel that is used for transmitting user plane data of a particular MBMS service to a plurality of users.

The UTRAN that provides MBMS service transmits, to a plurality of terminals, a MBMS-related control message (namely, a RRC message related to MBMS service data) via a MCCH (MBMS Control CHannel). Examples of an MBMS-related message include a message that informs MBMS service data, a message that informs point-to-multipoint RB data, etc. As shown in FIG. 3, the logical channel MCCH is a point-to-multipoint downlink channel that maps to a transport channel FACH (Forward Access CHannel), which maps to a physical channel SCCPCH (Secondary Common Control Physical CHannel). For a single cell, only one MCCH exists.

A terminal wishing to receive a particular MBMS that uses a point-to-multipoint RB, first receives via the MCCH, a RRC message that includes RB data, and then the point-to-multipoint RB is established with the terminal using such RB data. Thereafter, the terminal continues to receive the physical channel SCCPCH (to which the MTCH is mapped) and obtains the data of the particular MBMS service being transmitted via the MTCH.

When one session of a particular MBMS service that uses a point-to-multipoint RB is completed, the UTRAN transmits a message that instructs the release of the point-to-multipoint bearer, via the MCCH to the terminals that are receiving the particular MBMS service. Also, the UTRAN releases the point-to-multipoint RB established at the RNC and Node B. Meanwhile, a terminal that has received the above-identified message releases the point-to-multipoint RB that had been established with the terminal for the particular MBMS service.

While a particular MBMS service is in progress, one or more sessions for that service may occur in sequence. Here, a session may be defined in various ways. For example, a session may be each complete episode of a multi-episode drama or a session may be certain portions of a sports program, such as scenes that show goals in a soccer match.

When data to be transmitted for a particular MBMS service is generated at the MBMS data source, the core network (CN) 130 informs a session start to the RNC 123. In contrast, when there is no further data at the MBMS data source to be transmitted for a particular MBMS service, the core network (CN) 130 informs a session stop to the RNC 123. Between the session start and the session stop, a data transfer procedure for the particular MBMS service can be performed. Here, only those terminals that have joined a multicast group for the MBMS service may receive data that is transmitted by the data transfer procedure.

In the above session start procedure, the UTRAN that received the session start from the core network (CN) transmits an MBMS notification to the terminals. Here, MBMS notification refers a function of the UTRAN for informing a terminal that the transmission of data for a particular MBMS service within a certain cell is impending. The UTRAN can use the MBMS notification procedure to perform a counting operation that determines the number of terminals that wish to receive a particular MBMS service within a particular cell. The counting procedure is used to determine whether the radio bearer for providing the particular MBMS service should be set as point-to-multipoint (p-t-m) or point-to-point (p-t-p). For selecting the MBMS radio bearer, the UTRAN internally establishes a threshold value. After performing the counting function, the UTRAN may set a point-to-point MBMS radio bearer if the number of terminals existing within the corresponding cell is smaller than the threshold value, and may set a point-to-multipoint MBMS radio bearer if the number of terminals existing within the corresponding cell is greater than or equal to the threshold value.

If a point-to-point radio bearer is to be set, the UTRAN allocates a dedicated logical channel to each terminal (UE) and sends the data of the corresponding service. If a point-to-multipoint radio bearer is to be set, the UTRAN uses a downlink common logical channel to send the data of the corresponding service.

In the related art, the terminals that receive a particular MBMS service upon establishing a point-to-multipoint RB, release the established point-to-multipoint RB only after they receive a message from the system instructing that the point-to-multipoint RB should be released. However, in this case, those terminals that do not receive such message due to poor radio environment conditions or operation errors, cannot properly determine when the established point-to-multipoint RB should be released.

Accordingly, if the terminal is in a temporary data reception pause state and release of the RB is prematurely performed, the terminal cannot receive any MBMS service data that was transmitted after the temporary data reception pause. Also, if the terminal could not determine whether the RB should be released and thus releasing of the RB is not performed when necessary, the terminal must continue to unnecessarily maintain the point-to-multipoint RB, which thus results in a waste of terminal resources. Namely, in the related art, the terminal cannot distinguish between a temporary data reception pause and a RB release situation, and thus cannot properly determine when the point-to-multipoint RB should be released. This results in a problem for the terminal of not being able to effectively control the operations of maintaining and releasing a radio bearer. Thus, the inventors of the present invention recognized such drawbacks of the related art and provided a solution by allowing the terminal (UE) to release a point-to-multipoint radio bearer in either an explicit manner or an implicit manner, to be explained in more detail hereafter.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
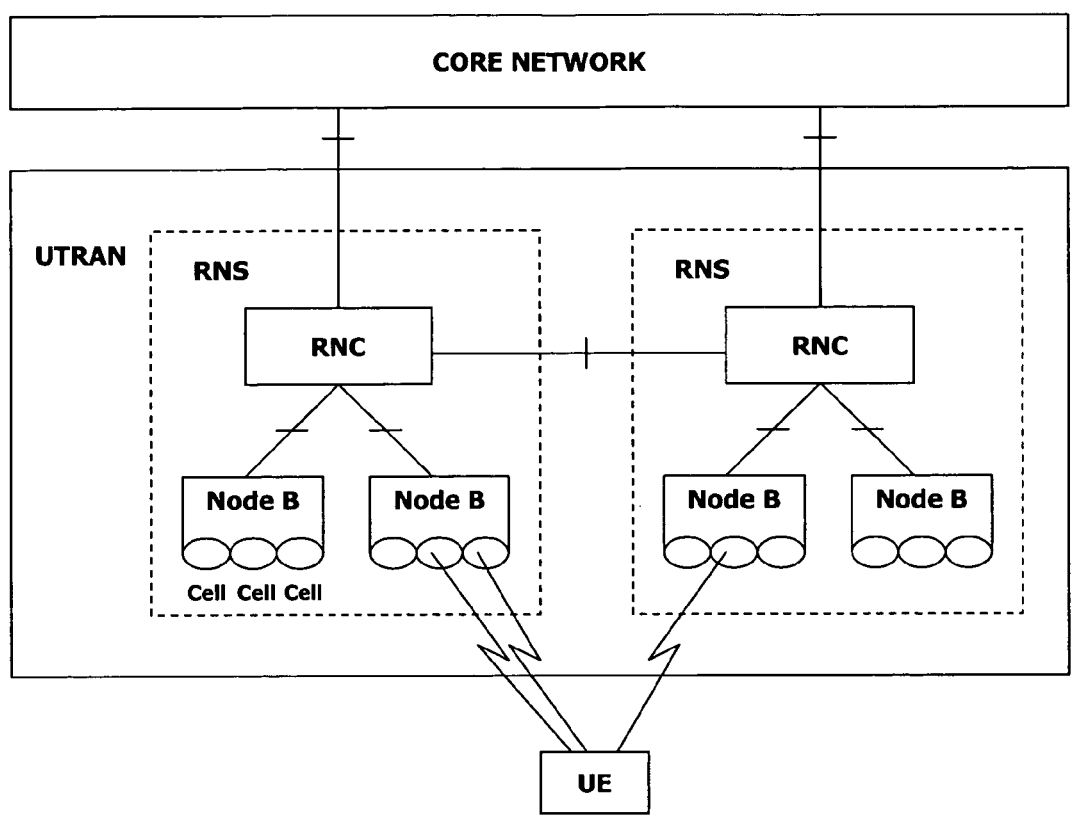
FIG. 1 depicts an exemplary basic structure of a UMTS network.
Figure 2:
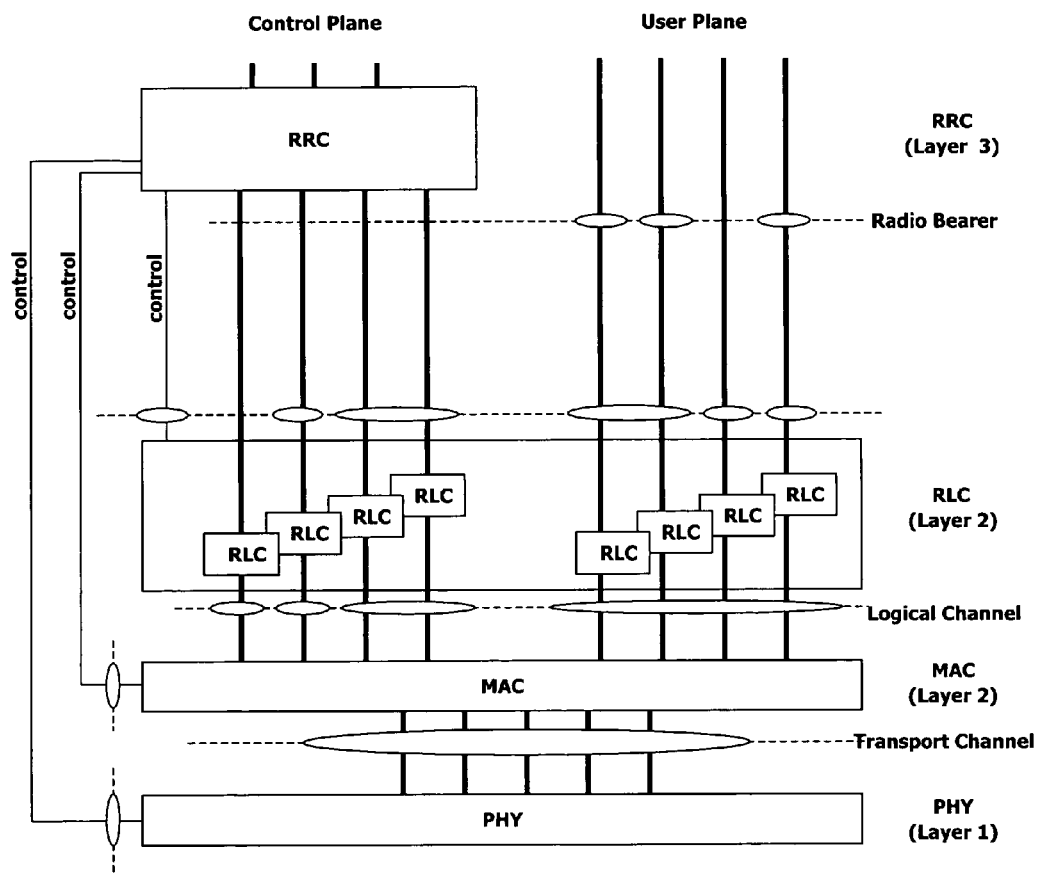
FIG. 2 depicts a radio access interface protocol architecture between the terminal and UTRAN that is based upon the 3GPP wireless access network.
Figure 3:
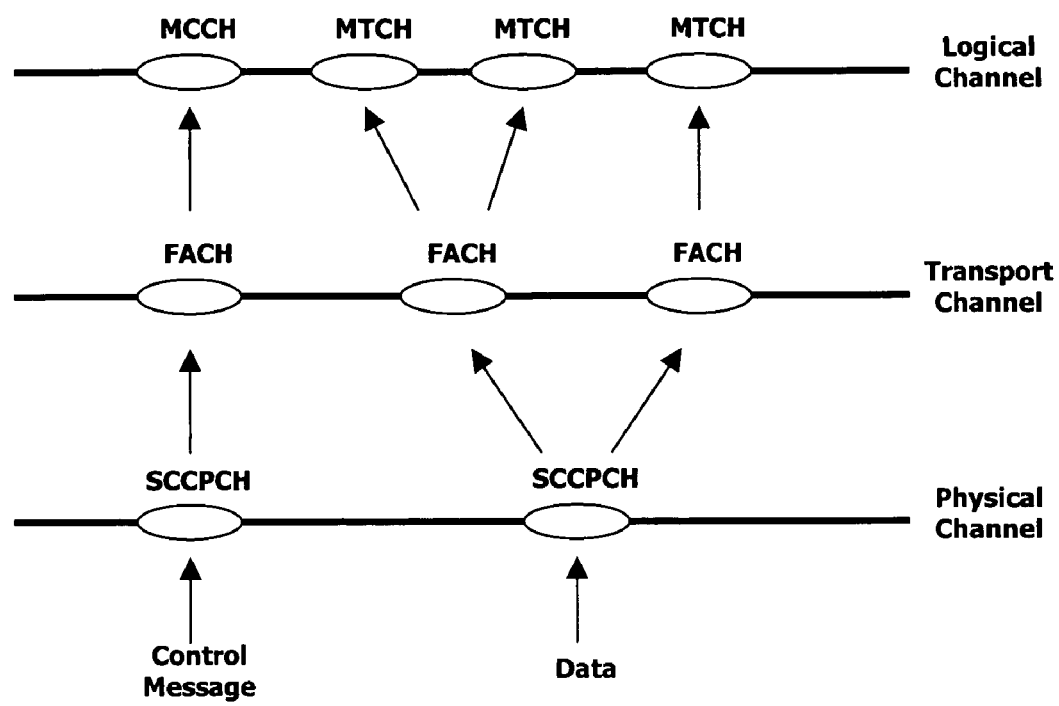
FIG. 3 depicts an example of channel mapping for MBMS in the terminal side.

The following description is based upon the presently preferred exemplary and non-limiting embodiments of the present invention. More particularly, various inventive concepts and principles embodied in systems and methods therein are discussed and described.

The present invention was developed in order to overcome the problems of the conventional art. Namely, a purpose of the present invention is to provide a mobile terminal (e.g., mobile station, user equipment (UE), etc.) that effectively controls the maintaining and releasing of a radio bearer (RB), by establishing a point-to-multipoint RB, receiving data of a multicast or broadcast service (e.g., a MBMS service, a point-to-multipoint service, etc.), and determining when to release the point-to-multipoint RB by checking the status of the multicast or broadcast service if data of the multicast or broadcast service is not received for a certain period of time.

A method for releasing the RB by a mobile terminal according to the present invention comprises, a radio system providing data units (packets) of a particular MBMS service via a particular point-to-multipoint RB to the mobile terminal, the mobile terminal establishes the point-to-multipoint RB and receives the data units therethrough, the mobile terminal triggers a timer when a data unit of the particular MBMS service is received, and the mobile terminal releases the established point-to-multipoint RB if another data unit of the particular MBMS service is not received by the time the timer has expired.

Preferably, when another data unit is received before the timer has expired, the mobile terminal initializes and re-triggers the timer.

Preferably, a particular entity provided in the mobile terminal can operate a timer for the data unit of a particular MBMS service. This entity can be located in the second layer (L2) of the radio protocol, and may be a MAC entity, a RLC entity, or a PDCP entity. If this entity in the mobile terminal operates a timer for a single data unit of the broadcast or multicast service, and then does not receive another data of the broadcast or multicast service before the timer expires, the entity in the mobile terminal reports the timer expiration to the RRC in the mobile terminal. The RRC in the mobile terminal, upon receiving the timer expiration report, performs the release of the point-to-multipoint RB established for the broadcast or multicast service.

Also, a method for releasing the RB by a mobile terminal according to the present invention comprises, a radio system providing data units (packet) of a MBMS service via a first point-to-multipoint RB and providing status information of the MBMS service via a second point-to-multipoint RB to the mobile terminal, the mobile terminal establishes the first point-to-multipoint RB and receives a data unit of the MBMS service therethrough, and if the mobile terminal does not receive another data unit of the MBMS service within a certain time period, the mobile terminal receives the status information via the second point-to-multipoint RB and determines the release of the first point-to-multipoint RB according to the status information.

Preferably, a particular entity provided in the mobile terminal can detect whether a data unit of the MBMS service is not received via a first point-to-multipoint RB within a particular time period. This entity can be located in the second layer (L2) of the radio protocol, and may be a MAC entity, a RLC entity, or a PDCP entity. When the particular entity detects that a data unit of the MBMS service is not received within the particular time period, this particular entity informs the RRC in the mobile terminal of this detection.

Preferably, the RRC in the mobile terminal being informed of the detection, receives the state information via a second point-to-multipoint RB. If the state information indicates that a session of the MBMS service is not ongoing, indicates that the MBMS service is not possible in the current situation, or indicates that the MBMS service is not provided via the first point-to-multipoint RB (i.e., the MBMS service is provided via a point-to-point RB), the mobile terminal determines that the first point-to-multipoint RB should be released.

Figure 4:
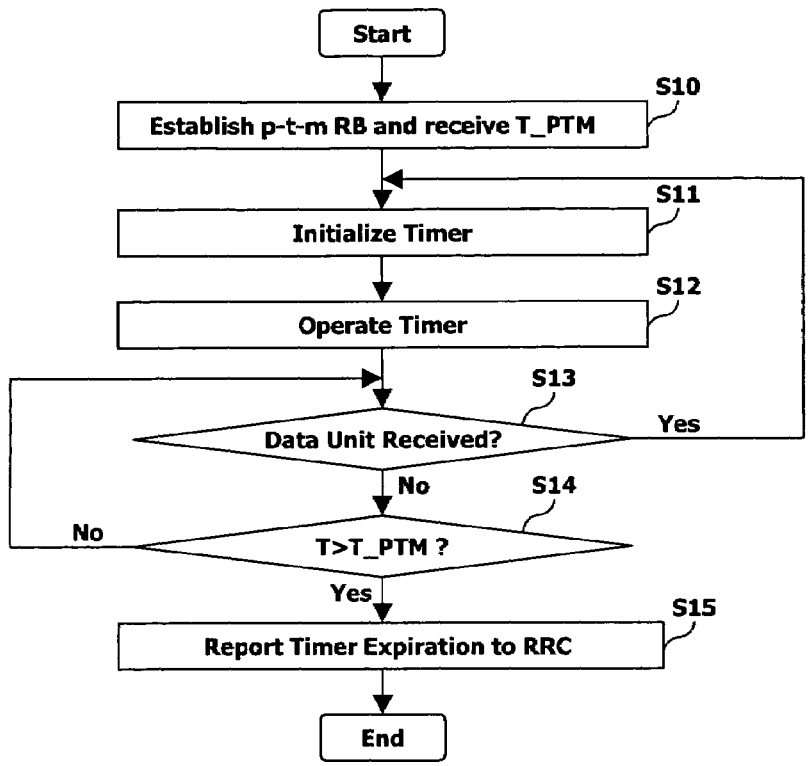
FIG. 4 depicts an exemplary method of detecting whether a data unit (packet) is received by the terminal according to the present invention.

FIG. 4 depicts an exemplary method of how a terminal detects that a data unit (packet) of a MBMS service is not received within a certain time period. Preferably, an L2 entity (namely, a PDCP, RLC, or MAC entity) located in the second layer (L2) of the radio protocol in the mobile terminal is used to determine whether a data unit of the MBMS service is not received during the certain time period while receiving the MBMS service via a first point-to-multipoint RB.

In step 1 (S10), according to the RRC in the mobile terminal commands, the L2 entity in the mobile terminal establishes a first point-to-multipoint RB. Also, the L2 entity in the mobile terminal receives and stores a T_PTM value from the RRC in the mobile terminal. The RRC in the mobile terminal may receive the T_PTM value from a RRC in the UTRAN.

In step 2 (S11), the L2 entity in the mobile terminal initializes the value of a timer T.

In step 3 (S12), the L2 entity in the mobile terminal operates the timer T for a data unit of the MBMS service.

In step 4 (S13), the L2 entity in the mobile terminal checks whether another data unit of the MBMS service has been received via the first point-to-multipoint RB during a period based upon set units of time, such as a TTI (Transmission Time Interval). If the another data unit of the MBMS service is received within a single TTI, the terminal L2 entity performs a subsequent step. If there is a data unit received within a single TTI, the terminal L2 entity performs step 2.

In step 5 (S14), the L2 entity in the mobile terminal determines whether the timer T has expired. Namely, the current timer T value and the stored T_PTM value are compared to determine if the T value is greater than the T_PTM value, and if so, it is determined that the timer T has expired. If T is greater than T_PTM, the L2 entity in the mobile terminal performs the subsequent step. If T is not greater than T_PTM, the L2 entity in the mobile terminal performs step 4.

In step 6 (S15), the L2 entity in the mobile terminal reports to the RRC in the mobile terminal that the timer T has expired.

Figure 5:
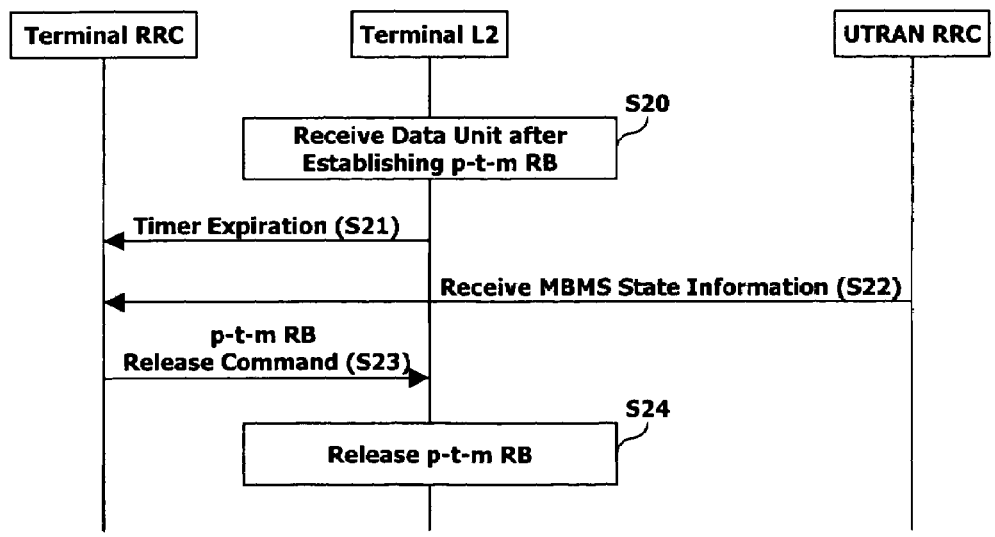
FIG. 5 depicts an exemplary method of releasing a point-to-multipoint radio bearer according to the present invention.

FIG. 5 depicts an exemplary method of releasing a point-to-multipoint RB used by a mobile terminal to receive data units (packets) of a particular MBMS service according to the present invention.

In step 1 (S20), as explained with respect to FIG. 4, the L2 entity in the mobile terminal establishes a first point-to-multipoint RB for a particular MBMS service, and receives data units of the MBMS service therethrough.

In step 2 (S21), if a data unit of the MBMS service is not received within a certain period of time, namely, when the timer expires, the L2 entity in the mobile terminal reports the timer expiration to the RRC in the mobile terminal.

In step 3 (S22), upon receiving the report of timer expiration, the terminal RRC in the mobile terminal receives MBMS status (state) information from a RRC in the UTRAN to determine the state of the particular MBMS service via a second point-to-multipoint RB. Preferably, MBMS status information comprises ID information of a MBMS service, whether a radio bearer has been established for the MBMS service, whether the established RB is a point-to-multipoint or a point-to-point type, whether a session of the MBMS service is currently ongoing or not, or whether the MBMS service may currently be provided or not. In more detail, the MBMS status information is included in a control message related to the MBMS, and transmitted to the mobile terminal via the MCCH. Preferably, the MBMS state information comprises a message that informs the MBMS service information or a message that informs the point-to-multipoint RB information.

In step 4 (S23), if in the above step, the received MBMS status information indicates that an RB is currently not established, or if the current RB type is point-to-point, or if a session of the MBMS is not ongoing, or if the MBMS service cannot be currently provided, the RRC in the mobile terminal instructs the L2 entity in the mobile terminal to release the first established point-to-multipoint RB.

In step 5 (S25), the L2 entity in the mobile terminal releases the first point-to-multipoint RB according to the instructions of the RRC in the mobile terminal.

It should be noted that the present invention can perform the point-to-multipoint RB release method without step 3, namely, without receiving MBMS status information. Here, the RRC in the mobile terminal receiving a timer expiration report of the L2 entity in the mobile terminal performs steps 4 and 5, without step 3. In other words, the RRC in the mobile terminal receiving the timer expiration report of the L2 entity in the mobile terminal immediately instructs the L2 entity in the mobile terminal to release the first established point-to-multipoint RB.

As described above, the present invention relates to establishing a point-to-multipoint (p-t-m) radio bearer (RB), receiving data of a particular multicast or broadcast service, and if data of the particular multicast or broadcast service is not received for a certain period of time, determining to release the point-to-multipoint RB by checking the status (state) of the multicast or broadcast service. By using such method, the terminal may effectively determine whether to maintain and/or release the point-to-multipoint radio bearer.

In other words, a terminal (e.g., mobile station, user equipment (UE), MBMS UE, etc.) according to the present invention can release a point-to-multipoint radio bearer (e.g., a MBMS RB) in an explicit manner or an implicit manner. The explicit RB release mechanism allows the network (e.g., UTRAN, etc.) to explicitly instruct the terminal to release the point-to-multipoint radio bearer (RB). However, because such explicit instructions may not be properly received by the terminal in certain situations, the terminal also has an implicit RB release mechanism that allows the terminal itself to release the point-to-multipoint radio bearer without receiving any explicit instructions from the network. A more detailed example will now be considered hereafter.

In the explicit RB release mechanism, an MBMS UE releases an MBMS radio bearer in the UE side if receiving an explicit release message given from UTRAN. This is a safe way because an MBMS UE releases an MBMS RB following the explicit release message from UTRAN. UTRAN may need to repeat the release message to make sure that all relevant UEs completely receive it. A new signaling flow can be used for this purpose. However, an existing signaling flow, such as MBMS Service Information or MBMS Radio Bearer Information, can be also considered as an alternative. A couple of possible ways of the Explicit MBMS RB Release mechanism are described hereafter.

As a new signaling flow, the MBMS Radio Bearer Release signaling flow can be considered to explicitly notify UEs of the MBMS RB Release message. This signaling flow is applicable for handling MBMS to UEs in PMM IDLE and CONNECTED mode. The purpose of the signaling flow is for CRNC to trigger one or more UEs to release an MBMS radio bearer carrying an MTCH for an MBMS service. The MBMS RADIO BEARER RELEASE message is only available for p-t-m transmission. The UTRAN may initiate this signaling flow when a session is stopped for the MBMS service or when the MBMS radio bearer needs to be released for an RRM purpose. The MBMS RADIO BEARER RELEASE may be repeatedly transmitted after its first transmission. Upon receiving the first MBMS RADIO BEARER RELEASE, the UE shall release the radio bearer carrying an MTCH. The MBMS RADIO BEARER RELEASE message includes: a MBMS Service ID and a Cause (e.g. session stop). More information may be included in the MBMS RADIO BEARER RELEASE.

The MBMS RB Release Indication may be contained in the MBMS SERVICE INFORMATION message. If the MBMS RB Release Indication is included in the received MBMS SERIVCE INFOMRATION message, a UE shall release an MBMS radio bearer indicated by the MBMS RB Release Indication.

The MBMS RB Release Indication may be contained in the MBMS RADIO BEARER INFORMATION message. If the MBMS RB Release Indication is included in the received MBMS RADIO BEARER INFORMATION message, a UE shall release an MBMS radio bearer indicated by the MBMS RB Release Indication.

The Implicit MBMS RB Release mechanism makes it possible for an MBMS UE to release an MBMS radio bearer in the UE side without receiving an explicit release message or information given from UTRAN. This is necessary owing to the fact that the Explicit MBMS RB Release mechanism is not sufficient at all times because some UEs may fail to correctly receive the MBMS RB Release message and encounter an abnormal situation. For instance, an MBMS UE may miss reception of the explicit release message because of cell change, bad channel and so on. In those cases, the implicit mechanism may be necessary as a complementary solution, since it prevents the MBMS UE from unnecessarily keeping the MBMS RB. A couple of possible ways of the Implicit MBMS RB Release mechanism are described in the following sub-sections.

A UE uses a timer to implicitly release an MBMS RB by itself. During a session, the UE triggers a timer whenever a new MBMS packet is received. The timer will be re-triggered whenever another MBMS packet is received in the UE. In this case, the UE is simply able to decide to release the MBMS RB when the timer is expired. The timer value may be given from UTRAN.

The MBMS Service Information signaling flow is used to inform UEs of all MBMS services in a cell. For this purpose, the MBMS SERVICE INFOMRAITON message includes MBMS Service Ids for MBMS services, which are being served or can be served in a cell. Thus, if the UE receiving an MBMS RB acquires the MBMS SERVICE IFNORMATION message, which does not contain the MBMS Service ID corresponding to the MBMS RB, then it is a right way for the UE to release the MBMS RB.

Accordingly, the present invention proposes the following MBMS UTRAN architecture principles. For MBMS radio bearer release in the UE, the UE releases the MBMS RB by using one of the following mechanisms: explicit MBMS RB release, and implicit MBMS RB release.

The explicit MBMS RB release mechanism allows the UTRAN to explicitly indicate to the MBMS UE that an MBMS radio bearer should be released. The explicit MBMS RB release indication is included in a new MBMS radio bearer release message or in an existing MBMS service information or MBMS radio bearer information message. If the explicit MBMS RB release indication is received, the UE releases the MBMS RB.

The implicit MBMS RB release mechanism allows a UE to release the MBMS radio bearer without receiving the MBMS RB release message given from the UTRAN. Namely, a UE uses a timer to implicitly release an MBMS RB. During a session, the UE triggers a timer whenever a new MBMS packet is received. The timer will be re-triggered whenever another MBMS packet is received in the UE. When the timer expires, the UE implicitly releases the MBMS RB. Preferably, the timer value is given from the UTRAN. Then, the UE releases the MBMS RB if the MBMS service identification (ID) corresponding to the MBMS RB does not appear in the MBMS service information message.

Figure 6:
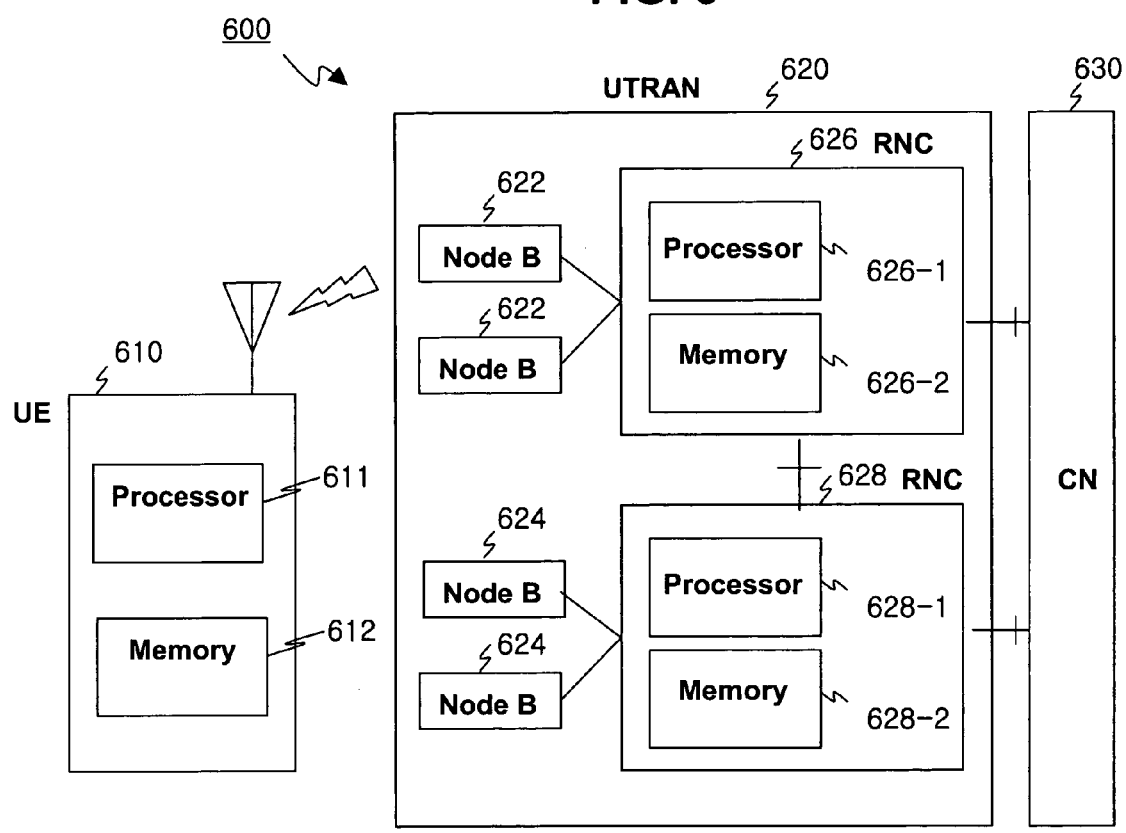
FIG. 6 depicts an exemplary communications system according to the present invention.

The present invention can employ a variety of software, hardware, and/or a combination thereof to achieve the above-identified procedures and steps for radio bearer (RB) release. For example, FIG. 6 depicts a communication system comprising a terminal (UE 610) in radio communication with a network (UTRAN 620 and CN 630) according to an embodiment of the present invention. The network (UTRAN 620 and CN 630) may include various hardware and software components. For example, the UTRAN 620 comprises an RNC (626), being connected to a plurality of Node Bs (622), and having a processor (626-1) and a memory (626-2). An RNC (628), being connected to a plurality of Node Bs (624), may also comprise a processor (628-1) and a memory (628-2). The RNCs (626, 628) are connected with one another via an interface, and connected with the CN (630) via another interface. The network (UTRAN 620 and CN 630) handles the various processing procedures for communications with the terminal (UE 610) as described previously. Here, it should be noted that various software codes and protocols that are required for achieving the present invention may be stored in one or more memory devices and executed by one or more processors located within the Node Bs (622, 624), the RNCs (626, 628), and/or other network elements.

The present invention provides a method of controlling a point-to-multipoint radio bearer used for a point-to-multipoint service, the method comprising: establishing a point-to-multipoint radio bearer for receiving data packets therethrough; triggering a timer whenever a data packet is received via said radio bearer; maintaining said radio bearer if a subsequent data packet is received within timer expiration; and releasing said radio bearer if a subsequent data packet is not received within timer expiration.

Also, the present invention provides a method of releasing a point-to-multipoint radio bearer used for a point-to-multipoint service, the method comprising: checking whether point-to-multipoint service data is received during a certain time period via a point-to-multipoint radio bearer; and if no point-to-multipoint service data is received during said certain time period, releasing said point-to-multipoint radio bearer.

Additionally, the present invention provides a mobile terminal for receiving a point-to-multipoint service, the terminal comprising: an antenna; a memory having software codes stored therein; and a processor connected with the antenna and the memory, the processor executing the software codes for, establishing a point-to-multipoint radio bearer for receiving data packets therethrough; triggering a timer whenever a data packet is received via said radio bearer; maintaining said radio bearer if a subsequent data packet is received within timer expiration; and releasing said radio bearer if a subsequent data packet is not received within timer expiration.

Also, the present invention provides a mobile terminal for receiving a point-to-multipoint service, the terminal comprising: an antenna; a memory having software codes stored therein; and a processor connected with the antenna and the memory, the processor executing the software codes for, checking whether point-to-multipoint service data is received through the antenna during a certain time period via a point-to-multipoint radio bearer; and if no point-to-multipoint service data is received during said certain time period, releasing said point-to-multipoint radio bearer.

Furthermore, the present invention provides a communications network for providing a point-to-multipoint service, the network comprising: a memory having software codes stored therein; and a processor connected with the memory, the processor executing the software codes for, transmitting point-to-multipoint service data to a mobile terminal that checks whether the point-to-multipoint service data is received during a certain time period via a point-to-multipoint radio bearer; and transmitting point-to-multipoint service status information to the mobile terminal if the mobile terminal determines that no point-to-multipoint service data is received during the certain time period, allowing the mobile terminal to release the point-to-multipoint radio bearer according to the point-to-multipoint service status information.

Although various aspects, embodiments, and features of the present invention have been described for a UMTS communications scheme, many of these techniques can be advantageously applied for other communications methods and systems.

The foregoing description of the preferred embodiments is provided to enable any person skilled in the art to make or use the present invention. Various modifications to these embodiments will be readily apparent to those skilled in the art, and the generic principles defined herein may be applied to other embodiments. Thus, the present invention is not intended to be limited to the embodiments shown herein but us to be accorded the widest scope consistent with the principles and novel features disclosed herein.

What is claimed is:

1. A method of releasing a multimedia broadcast/multicast service (MBMS) radio bearer (RB) used for a MBMS service, the method comprising:

establishing the MBMS RB for receiving data packets of the MBMS service at user equipment (UE);

receiving at the UE a MBMS service information message; and releasing by the UE the MBMS RB if MBMS identification corresponding to the MBMS RB is not present in the received MBMS service information message, wherein the releasing of the MBMS RB by the UE is performed without receiving at the UF a MBMS RB release indication from a network.

2. The method according to claim 1, wherein the MBMS service information message is received from a radio network controller (RNC).

3. The method according to claim 1, wherein the MBMS RB is a point-to-multipoint RB.

4. The method according to claim 1, wherein the receiving of the MBMS service information message occurs via a MBMS control channel (MCCH).

5. User equipment (UE) for receiving a multimedia broadcast/multicast service (MBMS), the UE comprising:
   a memory;
   a transceiver configured to receive a MBMS service information message; and
   a processor configured to access instructions stored in the memory to:
      establish a MBMS radio bearer (RB) to permit the receiving of data packets of a MBMS service, and
      release the MBMS RB if MBMS identification corresponding to the MBMS RB is not present in the received MBMS service information message, wherein the releasing of the MBMS RB is performed without receiving at the UE a MBMS RB release indication from a network.

6. The UE according to claim 5, wherein the MBMS service information message is received from a radio network controller (RNC).

7. The UE according to claim 5, wherein the MBMS RB is a point-to-multipoint RB.

8. The UE according to claim 5, wherein the transceiver is further configured to receive the MBMS service information message via a MBMS control channel (MCCH).

* * * * *